(12) United States Patent
Aoki

(10) Patent No.: US 10,096,865 B2
(45) Date of Patent: Oct. 9, 2018

(54) SECONDARY CELL MODULE

(71) Applicant: HITACHI AUTOMOTIVE SYSTEMS, LTD., Hitachinaka-shi, Ibaraki (JP)

(72) Inventor: Sadayuki Aoki, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 256 days.

(21) Appl. No.: 15/037,189

(22) PCT Filed: Dec. 13, 2013

(86) PCT No.: PCT/JP2013/083457
§ 371 (c)(1),
(2) Date: May 17, 2016

(87) PCT Pub. No.: WO2015/087438
PCT Pub. Date: Jun. 18, 2015

(65) Prior Publication Data
US 2016/0294023 A1    Oct. 6, 2016

(51) Int. Cl.
*H01M 10/48* (2006.01)
*H01M 2/20* (2006.01)
*H01M 2/30* (2006.01)
*H01R 4/48* (2006.01)
*H01R 25/16* (2006.01)

(52) U.S. Cl.
CPC ............ *H01M 10/48* (2013.01); *H01M 2/202* (2013.01); *H01M 2/206* (2013.01); *H01M 2/30* (2013.01); *H01R 4/48* (2013.01); *H01R 25/161* (2013.01)

(58) Field of Classification Search
None
See application file for complete search history.

(56) References Cited

U.S. PATENT DOCUMENTS

| | | | |
|---|---|---|---|
| 2004/0197647 A1 | 10/2004 | Murashige et al. | |
| 2011/0045329 A1 | 2/2011 | Ikeda et al. | |
| 2011/0248719 A1* | 10/2011 | Aoki | H01M 10/482 324/426 |
| 2012/0038365 A1 | 2/2012 | Nagata et al. | |
| 2012/0212232 A1 | 8/2012 | Ikeda et al. | |

FOREIGN PATENT DOCUMENTS

| | | |
|---|---|---|
| JP | 2003-178796 A | 6/2003 |
| JP | 2009-187895 A | 8/2009 |
| JP | 2009-231138 A | 10/2009 |
| JP | 2010-257686 A | 11/2010 |
| JP | 2011-040335 A | 2/2011 |
| JP | 2011-119075 A | 6/2011 |
| JP | 2013-114956 A | 6/2013 |
| WO | 2011/052699 A1 | 5/2011 |
| WO | 2013/080780 A1 | 6/2013 |

* cited by examiner

*Primary Examiner* — Daniel S Gatewood
(74) *Attorney, Agent, or Firm* — Volpe and Koenig, P.C.

(57) ABSTRACT

A secondary battery module includes an annular member making a tip end of a connection terminal of a bus bar and a tip end of a voltage detection terminal inserted therein in an axial direction to be aligned with each other in terms of directions. The annular member includes an elastic deformation portion biasing the connection terminal and the voltage detection terminal in directions of making the connection terminal and the voltage detection terminal press each other. Accordingly, reliability to deal with an external cause is high, and an assembling operation is facilitated.

13 Claims, 9 Drawing Sheets

SECONDARY CELL MODULE

TECHNICAL FIELD

The present invention relates to a secondary battery module including a plurality of battery cells and enabling supply and storage of electric energy.

BACKGROUND ART

Conventionally known is a power-supply device including a battery assembly composed of a plurality of batteries each having a positive electrode at one end of the battery and a negative electrode at the other end of the battery, the batteries overlapped with each other in a manner that electrodes having the different polarities are adjacent to each other (for example, refer to PTL 1 described below).

The power-supply device described in PTL 1 includes bus bars connecting the plurality of batteries in series by connecting the adjacent electrodes having the different polarities of the plurality of batteries adjacent to each other. Each bus bar is provided with a terminal. This terminal includes an electric contact part attached to the bus bar, and a wire connecting part continued to the electric contact part, and attached to an electric wire connected to a voltage detecting means for detecting voltage of the battery. The electric contact part of the terminal includes a pair of clipping pieces disposed with a gap from each other, and connected to the bus bar by press-inserting the bus bar into between the clipping pieces.

Also, disclosed is a configuration in which a voltage detection terminal detecting voltage of an electricity storage device is connected to an electrode of the electricity storage device so that a crimp contact surface side of the voltage detection terminal to which an electric cable is crimped may face in a direction opposite to the electrode of the electricity storage device (for example, refer to PTL 2 described below). In the electricity storage device described in PTL 2, a crimp contact portion of the voltage detection terminal is connected by screwing to a battery electrode column, together with a bus bar.

CITATION LIST

Patent Literature

PTL 1: Japanese Patent Application Laid-Open No. 2011-40335
PTL 2: Japanese Patent Application Laid-Open No. 2010-257686

SUMMARY OF INVENTION

Technical Problem

In the power-supply device described in PTL 1, the terminal is connected to the bus bar when the bus bar is press-inserting into between the pair of clipping pieces included in the electric contact part of the terminal. Thus, the terminal can be attached to the bus bar without screwing a nut, which dispenses with a terminal rotation stopper of a plate. However, in the structure in which the bus bar is press-inserted into between the clipping pieces, the connection force between the terminal and the bus bar may be lowered by an external cause such as vibration of the power-supply device. In such a case, contact resistance between the terminal and the bus bar may increase to cause an electric conduction loss, and the voltage of the battery cannot be detected by the voltage detecting means accurately, which may have an adverse effect on reliability of a product.

In the electricity storage device described in PTL 2, since the plurality of voltage detection terminals need to be connected by screwing, operability in a wiring process may be poor, which may cause an increase in cost for manufacturing a product.

The present invention is accomplished by taking such problems as mentioned above into consideration thereof, and an object thereof is to provide a secondary battery module having high reliability to deal with an external cause and facilitating an assembling operation.

Solution to Problem

In order to solve the above issue, a secondary battery module according to the present invention includes an annular member making a tip end of a connection terminal of a bus bar and a tip end of a voltage detection terminal inserted therein in an axial direction to be aligned with each other in terms of directions, wherein the annular member includes an elastic deformation portion biasing the connection terminal and the voltage detection terminal in directions of making the connection terminal and the voltage detection terminal press each other.

Advantageous Effects of Invention

According to the secondary battery module according to the present invention, when the tip end of the connection terminal of the bus bar and the tip end of the voltage detection terminal are inserted into the annular member to be aligned with each other in terms of the directions, the connection terminal and the voltage detection terminal are biased by the elastic deformation portion in the directions of making the connection terminal and the voltage detection terminal press each other and are brought in close contact with each other, and electric conduction is secured. Accordingly, a secondary battery module having high reliability to deal with an external cause and facilitating an assembling operation can be provided.

Problems, configurations, and effects other than the aforementioned ones become apparent in the following description of embodiments.

DESCRIPTION OF EMBODIMENTS

Hereinbelow, embodiments of a battery module according to the present invention will be described in detail with reference to the drawings.

Figure 1:
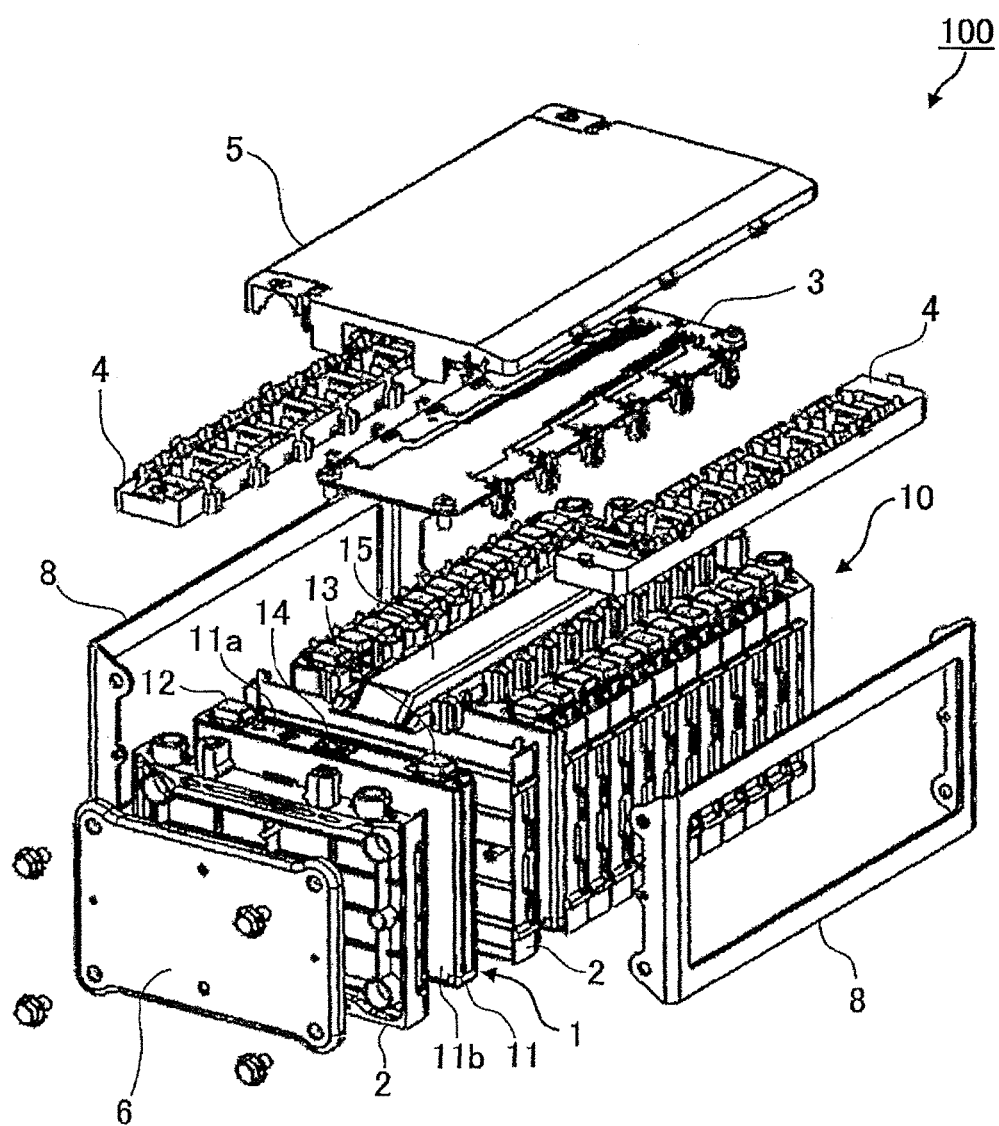
FIG. 1 is an exploded perspective view of a secondary battery module according to an embodiment of the present invention.
Figure 2:
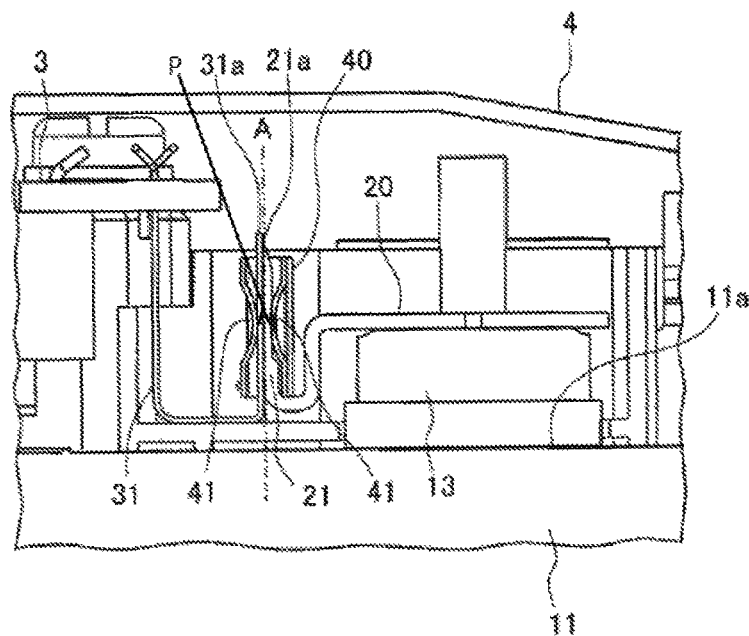
FIG. 2 is an enlarged cross-sectional view of the secondary battery module illustrated in FIG. 1.

FIG. 1 is an exploded perspective view of a secondary battery module 100 according to a first embodiment of the present invention. FIG. 2 is an enlarged view of an external terminal and its vicinity on a cross-section along a width direction of a rectangular secondary battery 1 of the assembled secondary battery module 100.

The secondary battery module 100 includes a cell block 10 in which a plurality of flat rectangular secondary batteries 1 are laminated in a thickness direction via cell holders 2, a voltage detection substrate 3 detecting voltage of the rectangular secondary batteries 1, bus bar covers 4 and 4 provided on both sides of the voltage detection substrate 3, and an upper cover 5 covering an upper portion of these parts. A pair of end plates 6 and a pair of side frames 8 are arranged around the cell block 10. It is to be noted that illustration of one of the end plates 6 in a laminating direction is omitted in FIG. 1.

Each rectangular secondary battery 1 includes a rectangular-box-shaped flat battery container 11 and positive-electrode and negative-electrode external terminals 12 and 13. The positive-electrode and negative-electrode external terminals 12 and 13 are provided at both end portions in a width direction of an upper surface 11a of the battery container 11. The battery container 11 contains positive and negative electrodes respectively connected to the positive-electrode and negative-electrode external terminals 12 and 13, an electrolyte, and the like. A center portion in the width direction of the upper surface 11a of the battery container 11 is provided with a safety valve 14 emitting gases when internal pressure of the battery container 11 increases, and an upper portion of the safety valve 14 is covered with a duct 15. The rectangular secondary batteries 1 are laminated so that wide side surfaces 11b each having the largest area among side surfaces of the battery container 11 may be opposed to each other.

The endplates 6 are arranged on both sides in the laminating direction of the rectangular secondary batteries 1 and are opposed to the wide side surfaces 11b of the rectangular secondary batteries 1 arranged on both the sides in the laminating direction. The side frames 8 extend in the laminating direction of the rectangular secondary batteries 1 and are arranged on both sides in a width direction of the rectangular secondary batteries 1. By tightening bolts or the like to connect both ends of the paired side frames 8 with side end portions of the paired end plates 6, the plurality of rectangular secondary batteries 1 constituting the cell block 10 are respectively interposed between the cell holders 2 and are fixed in the thickness direction and in the width direction.

The bus bar covers 4 are arranged on both sides of the voltage detection substrate 3 in the width direction of the rectangular secondary batteries 1 and are formed in frame shapes extending in the laminating direction of the rectangular secondary batteries 1. The bus bar covers 4 separate the external terminals 12 and 13 of the rectangular secondary batteries 1 adjacent in the laminating direction and connected to each other to isolate and insulate bus bars adjacent in the laminating direction from each other.

The voltage detection substrate 3 is, for example, screwed shut on projections provided on upper surfaces of the cell holders 2 arranged inside the end plates 6 and is held on the cell block 10. The voltage detection substrate 3 includes elements adapted to measure voltage of the respective rectangular secondary batteries 1, and voltage detection terminals 31 as illustrated in FIG. 2. Each voltage detection terminal 31 is made of a conductive metal material such as copper and aluminum, is formed in a flat plate shape extending in one direction, and is folded as needed.

In the present embodiment, a tip end 31a of the voltage detection terminal 31 faces upward along a height direction of the battery container 11 perpendicular to the upper surface 11a of the battery container 11 of the rectangular secondary battery 1. The tip end 31a of the voltage detection terminal 31, as well as a connection terminal 21 provided to the bus bar 20 to be welded on the external terminal 12 or 13 of the rectangular secondary battery 1, is inserted in an annular member 40.

In the annular member 40, a tip end 21a of the connection terminal 21 of the bus bar 20 and the tip end 31a of the voltage detection terminal 31 are inserted in a direction of an axis A to be aligned with each other in terms of the directions. The annular member 40 includes elastic deformation portions 41 biasing the connection terminal 21 and the voltage detection terminal 31, which have been inserted therein in the direction of the axis A, in directions of making the connection terminal 21 and the voltage detection terminal 31 press each other. Each elastic deformation portion 41 projects inside the annular member 40 and is provided to enable elastic deformation to an outside. The annular member 40 is made of an equal metal material to that for the bus bar 20 or the voltage detection terminal 31 or a conductive metal material such as iron and stainless steel.

Figure 3:
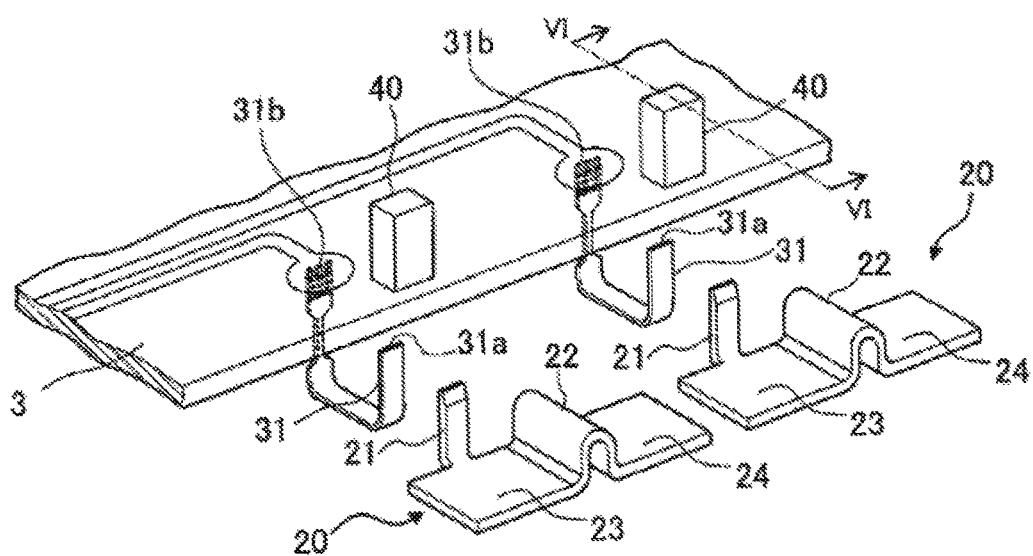
FIG. 3 is an enlarged perspective view of a voltage detection substrate, bus bars, and annular members included in the secondary battery module illustrated in FIG. 1.

FIG. 3 is a perspective view of the voltage detection substrate 3, the bus bars 20, and the annular members 40 detached from the secondary battery module 100 and is an enlarged perspective view illustrating a part around the voltage detection terminals 31 of the voltage detection substrate 3.

A base end portion 31b of the voltage detection terminal 31 passes through the voltage detection substrate 3 and is soldered to a wire on the voltage detection substrate 3, for example, by a flow method. It is to be noted that the base end portion 31b of the voltage detection terminal 31 may be soldered to the wire on the voltage detection substrate 3 by a ref low method. Soldering of the base end portion 31b of the voltage detection terminal 31 by the reflow method will be described below with reference to the drawings.

The bus bar 20 is manufactured by forming a flat-plate-shaped member made of a metal material such as copper and aluminum by means of press working or the like, is provided at a center portion thereof in the longitudinal direction with a curved portion 22, and is provided at one end and the other end thereof with flat connection portions 23 and 24. In a case in which a material for the positive-electrode external terminal 12 of the rectangular secondary battery 1 is aluminum, and in which a material for the negative-electrode external terminal 13 is copper, an Al—Cu clad material is preferably used as a material for the bus bar 20.

The connection portions 23 and 24 of the bus bar 20 are connected to the external terminals 12 and 13 of the adjacent rectangular secondary batteries 1 by means of, for example, welding. The connection portion 23 to be connected to the negative-electrode external terminal 13 of the rectangular secondary battery 1 is provided with the connection terminal 21 erected perpendicularly to the connection portion 23. For example, as illustrated in FIG. 2, it is to be noted that the connection terminal 21 may be folded downward toward the upper surface 11a of the battery container 11 and may then be folded several times so that the tip end 21a thereof may point toward an equal direction to that of the tip end 31a of the voltage detection terminal 31.

In the present embodiment, in order for a material for the connection terminal 21 to be equal to a material for the voltage detection terminal 31, the connection terminal 21 is provided at the negative-electrode-side connection portion 23 of the bus bar 20. The connection terminal 21 is provided in a flat plate shape extending upward along a height direction of the rectangular secondary battery 1 perpendicular to the upper surface 11a of the battery container 11 in a state in which the bus bar 20 is connected to the external terminals 12 and 13 of the rectangular secondary batteries 1.

Figure 4A:
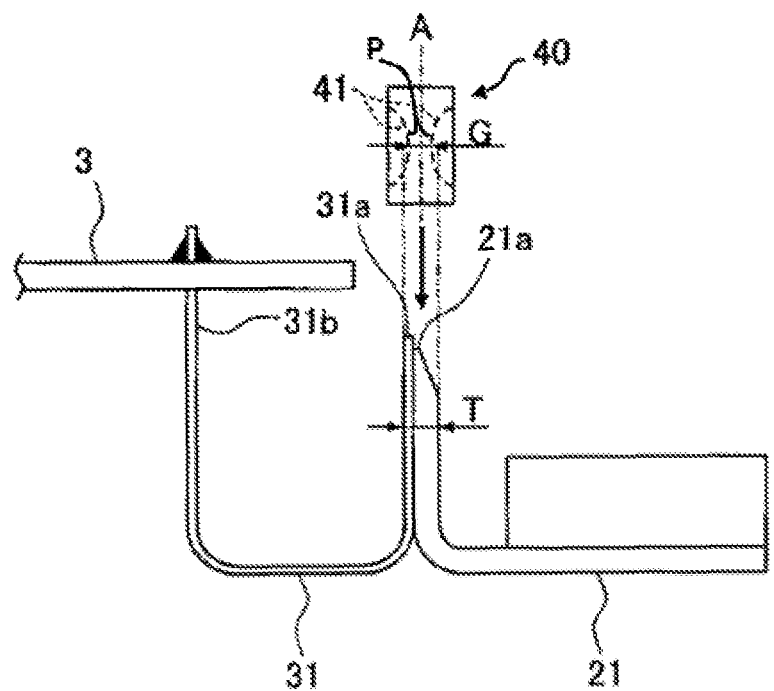
FIG. 4A is an enlarged side view of the secondary battery module illustrated in FIG. 1 before being assembled.
Figure 4B:
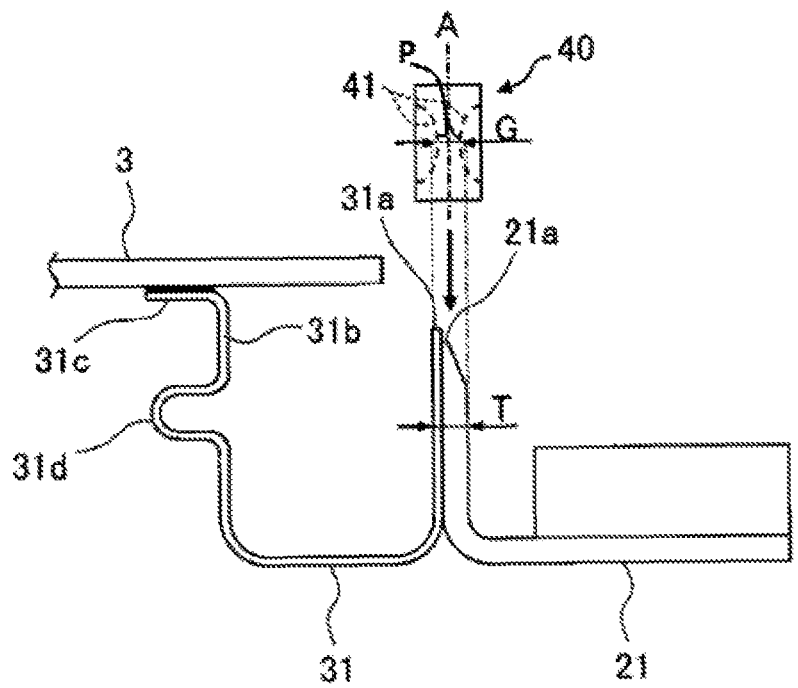
FIG. 4B is an enlarged side view of the secondary battery module illustrating a modification example of FIG. 4A.
Figure 5:
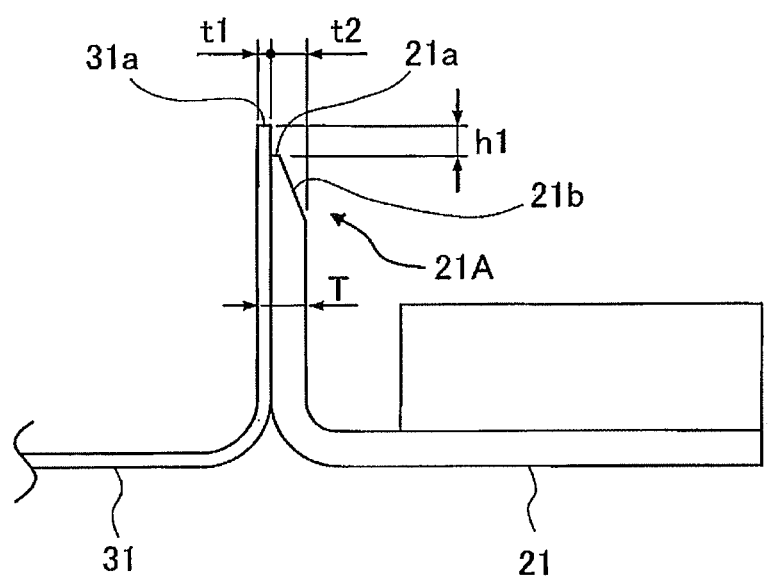
FIG. 5 is an enlarged view of a tip end of a connection terminal and a tip end of a voltage detection terminal illustrated in FIGS. 4A and 4B.

FIG. 4A is an enlarged side view illustrating a state before the tip end 21a of the connection terminal 21 of the bus bar 20 and the tip end 31a of the voltage detection terminal 31 are inserted into the annular member 40 in the direction of the axis A to be aligned with each other in terms of the directions. FIG. 4B is an enlarged side view illustrating a modification example of the voltage detection terminal 31 illustrated in FIG. 4A. FIG. 5 is an enlarged view of the tip end 21a of the connection terminal 21 and the tip end 31a of the voltage detection terminal 31 illustrated in FIGS. 4A and 4B.

As illustrated in FIG. 4A, the base end portion 31b of the voltage detection terminal 31 passes through the voltage detection substrate 3 and is soldered to the wire on an upper surface of the voltage detection substrate 3 by the flow method. In a case in which the base end portion 31b of the voltage detection terminal 31 is to be soldered to the wire on the voltage detection substrate 3 by the reflow method, a connection portion 31c made by folding the base end portion 31b of the voltage detection terminal 31 approximately orthogonally is soldered to the wire on a lower surface of the voltage detection substrate 3 as illustrated in FIG. 4B. In this case, it is preferable to provide a curved portion 31d made by curving a part of the voltage detection terminal 31 extending perpendicularly to the voltage detection substrate 3. By doing so, when the voltage detection terminal 31 is soldered by the reflow method, the connection portion 31c can be brought into close contact with the voltage detection substrate 3 while the curved portion 31d is elastically deformed, and a dimensional tolerance in a direction perpendicular to the upper surface 11a of the battery container 11 can be absorbed.

As illustrated in FIGS. 4A and 4B, the connection terminal 21 and the voltage detection terminal 31 are formed in flat plate shapes extending in the direction of the axis A of the annular member 40 and are inserted into the annular member 40 in the direction of the axis A in a state in which the tip ends 21a and 31a are aligned with each other in terms of the directions and are overlapped in the thickness direction. Before the connection terminal 21 and the voltage detection terminal 31 are inserted into the annular member 40, a gap G between the pair of elastic members 41 and 41 projecting inside the annular member 40 is shorter than a thickness T of the connection terminal 21 and the voltage detection terminal 31.

As illustrated in FIG. 5, a thickness t1 of the voltage detection terminal 31 is shorter than a thickness t2 of the connection terminal 21. Also, the tip end 31a of the voltage detection terminal 31 projects further by a height h1 than the tip end 21a of the connection terminal 21 in the direction of the axis A of the annular member 40. A tip end portion 21A of the connection terminal 21 is provided with an inclined surface 21b facing outside the annular member 40 and opposed to an inner circumferential surface of the annular member 40, and the tip end portion 21A is shorter in thickness t2 at a closer position thereof to the tip end 21a.

Figure 6A:
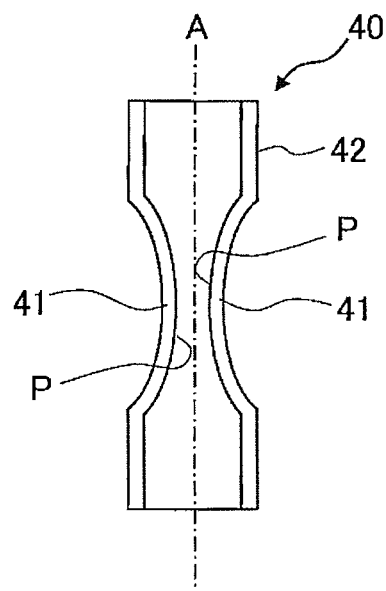
FIG. 6A is a cross-sectional view of the annular member along the line VI-VI in FIG. 3.
Figure 6B:
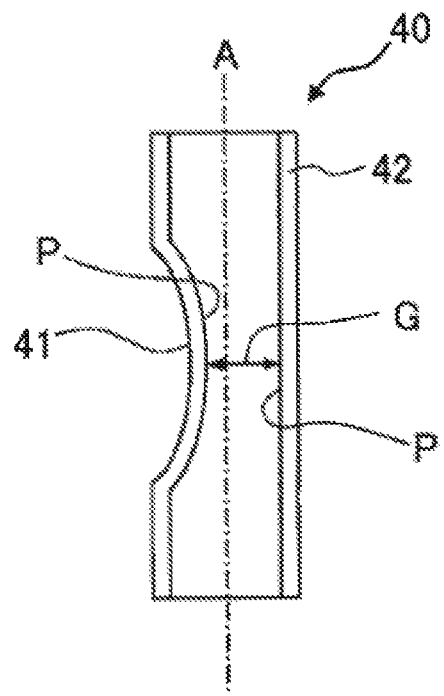
FIG. 6B is a cross-sectional view illustrating a modification example of the annular member illustrated in FIG. 6A.

FIG. 6A is a cross-sectional view of the annular member 40 along the line VI-VI in FIG. 3. FIG. 6B a cross-sectional view along the line VI-VI in FIG. 3 illustrating a modification example of the annular member 40 illustrated in FIG. 6A.

As illustrated in FIGS. 6A and 6B, the annular member 40 is formed, for example, in a rectangular cylindrical shape, and includes a main body portion 42 provided annularly to continue in a circumferential direction. The elastic deformation portion 41 is formed in an arch shape with both ends thereof in the direction of the axis A supported by the main body portion 42 and with a center portion thereof in the direction of the axis A curved and projecting inside the main body portion 42. The pair of elastic deformation portions 41 nipping the connection terminal 21 and the voltage detection terminal 31 may be provided on both sides in a direction intersecting with the direction of the axis A of the annular member 40 as illustrated in FIG. 6A, or the single elastic deformation portion 41 nipping the connection terminal 21 and the voltage detection terminal 31 between the single elastic deformation portion 41 and the opposed main body portion 42 may be provided on one side in the direction intersecting with the direction of the axis A of the annular member 40 as illustrated in FIG. 6B. In the case of providing the single elastic deformation portion 41 as illustrated in FIG. 6B, the gap G between the elastic deformation portion 41 and the main body portion 42 opposed in the direction intersecting with the direction of the axis A of the annular member 40 is set to be shorter than the thickness T of the voltage detection terminal 31 and the connection terminal 21 when overlapped illustrated in FIG. 5.

A surface of the annular member 40 contacting the connection terminal 21 and the voltage detection terminal 31 is provided with a plated layer P having a lower modulus of elasticity than the annular member 40. Examples of the plated layer P can be an Sn plate, an Ag plate, and an Au plate. The annular member 40 contacts the connection terminal 21 and the voltage detection terminal 31 via the plated layer P. Also, a material, a thickness, and the like of the voltage detection terminal 31 are set so that the voltage detection terminal 31 may have flexibility to enable elastic deformation in the direction intersecting with the direction of the axis A by abutting on the plated layer P.

Figure 7A:
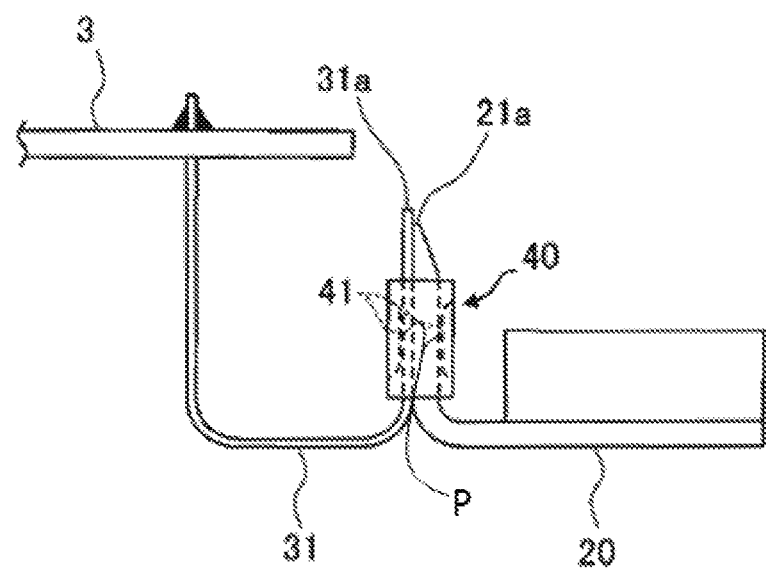
FIG. 7A is an enlarged side view of the secondary battery module illustrated in FIG. 1 after being assembled.
Figure 7B:
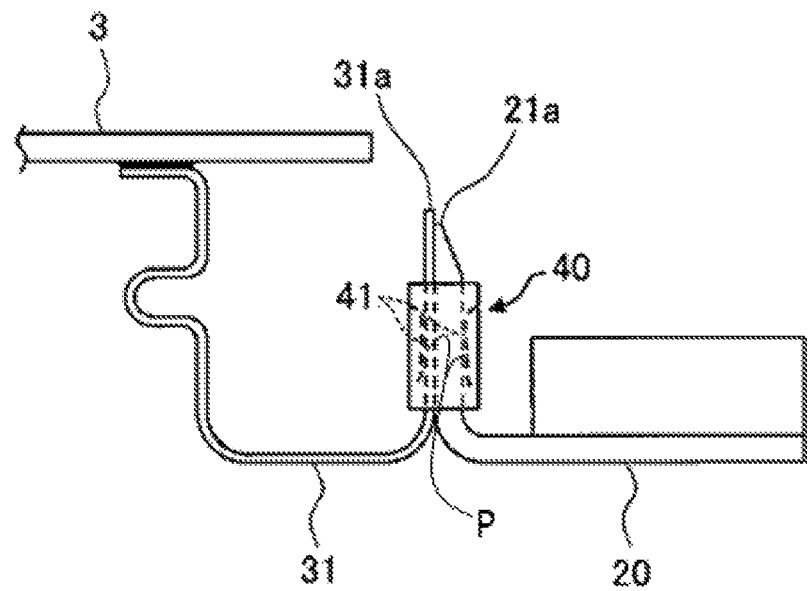
FIG. 7B is an enlarged side view of the secondary battery module illustrating a modification example of FIG. 7A.

FIGS. 7A and 7B are enlarged side views corresponding to FIGS. 4A and 4B and respectively illustrate states in which the tip end 21a of the connection terminal 21 and the tip end 31a of the voltage detection terminal 31 have been inserted into the annular member 40 to be aligned with each other in terms of the directions.

The tip end 21a of the connection terminal 21 and the tip end 31a of the voltage detection terminal 31 are inserted into the annular member 40 to cause the elastic deformation portions 41 to be elastically deformed from the inside to the outside and to bias the connection terminal 21 and the voltage detection terminal 31 in the directions of making the connection terminal 21 and the voltage detection terminal 31 press each other. Accordingly, opposed surfaces of the flat-plate-shaped connection terminal 21 and voltage detection terminal 31 overlapped with each other in the thickness direction come in close contact with each other, and electric conduction is secured.

The elastic deformation portions 41 are provided to be elastically deformed from the inside to the outside of the annular member 40 at the time of nipping the connection terminal 21 and the voltage detection terminal 31 to cause the connection terminal 21 and the voltage detection terminal 31 to press each other with a force of 3.5 N/mm$^2$ or higher. Specifically, a dimension and a shape of each elastic deformation portion 41 are designed to obtain the aforementioned pressing force in consideration of a modulus of elasticity of a material for the annular member 40, a deformation amount of the elastic deformation portion 41 determined by the thickness t2 of the connection terminal 21 and the thickness t1 of the voltage detection terminal 31, and the like.

Next, effects of the secondary battery module 100 according to the present embodiment configured as above will be described.

In the secondary battery module 100, when the external terminals 12 and 13 of the plurality of rectangular secondary batteries 1 constituting the cell block 10 are connected by the bus bars 20 and are connected to an external device such as an electric car, electric energy stored in the rectangular secondary batteries 1 is supplied to, for example, a motor of the electric car, and regenerative power energy supplied from the electric car is stored in the rectangular secondary batteries 1. Here, in the secondary battery module 100, the voltage detection substrate 3 detects voltage of the rectangular secondary batteries 1 to control charging/discharging of the rectangular secondary batteries 1.

For example, in a case in which the secondary battery module 100 is mounted in an electric car, the secondary battery module 100 is frequently exposed to an external cause such as vibration. In a conventional secondary battery module 100, a connection force between the terminal of the voltage detection substrate 3 and the bus bar 20 may be lowered by such an external cause. Also, in a case in which the plurality of voltage detection terminals 31 are connected by screwing to the bus bars 20, operability in a wiring process may be poor, which may cause an increase in cost for manufacturing a product.

Conversely, the secondary battery module 100 according to the present embodiment includes the annular member 40 into which the tip end 21a of the connection terminal 21 of the bus bar 20 and the tip end 31a of the voltage detection terminal 31 are inserted in the direction of the axis A to be aligned with each other in terms of the directions, and the annular member 40 includes the elastic deformation portions 41 biasing the connection terminal 21 and the voltage detection terminal 31 in the directions of making the connection terminal 21 and the voltage detection terminal 31 press each other. Thus, electric conduction between the connection terminal 21 and the voltage detection terminal 31 can be secured by the single process of inserting the connection terminal 21 and the voltage detection terminal 31 into the annular member 40 at the same time, and an assembling operation is facilitated. Accordingly, with the secondary battery module 100 according to the present embodiment, operability in a wiring process can be improved, and cost for manufacturing a product can be decreased.

Also, since the connection terminal 21 and the voltage detection terminal 31 are in a state of being surrounded by the annular member 40, the annular member 40 is prevented from coming off due to an external cause such as vibration. Further, in the present embodiment, since the connection terminal 21 and the tip end 31a of the voltage detection terminal 31 point toward the height direction of the rectangular secondary battery 1 perpendicular to the upper surface 11a of the battery container 11, the annular member 40 is prevented from coming off more effectively by an action of gravity. Still further, since the elastic deformation portions 41 bias the connection terminal 21 and the voltage detection terminal 31 in the directions of making the connection terminal 21 and the voltage detection terminal 31 press each other, an increase in contact resistance between the connection terminal 21 and the voltage detection terminal 31 due to an external cause such as vibration is prevented.

Also, the annular member 40 according to the present embodiment includes the annular main body portion 42. Each of the elastic deformation portions 41 has both the ends thereof in the direction of the axis A supported by the main body portion 42 and has the center portion thereof in the direction of the axis A curved and projecting inside the main body portion 42. Both the ends of each of the elastic deformation portions 41 are supported in this manner to enable the force of making the connection terminal 21 and the voltage detection terminal 31 press each other to be enlarged by the elastic deformation portions 41.

For example, with such a configuration, the connection terminal 21 and the voltage detection terminal 31 can press each other with the force of 3.5 N/mm$^2$ or higher, and the contact resistance between the connection terminal 21 and the voltage detection terminal 31 can be decreased sufficiently. It is to be noted that, when the force of making the connection terminal 21 and the voltage detection terminal 31 press each other is lower than 3.5 N/mm$^2$, the contact resistance cannot be decreased sufficiently, which may cause an electric conduction loss.

Also, the connection terminal 21 and the voltage detection terminal 31 according to the present embodiment are formed in the flat plate shapes extending in the direction of the axis A of the annular member 40, and the thickness t1 of the voltage detection terminal 31 is shorter than the thickness t2 of the connection terminal 21. Thus, when the voltage detection terminal 31 and the connection terminal 21 overlap with and contact each other, the voltage detection terminal 31 is elastically deformed more easily than the connection terminal 21. For this reason, the voltage detection terminal 31 can be deformed to conform to the shape of the connection terminal 21 to bring the voltage detection terminal 31 in close contact with the connection terminal 21, which can prevent a gap from being generated between the voltage detection terminal 31 and the connection terminal 21. Accordingly, the contact resistance between the connection terminal 21 and the voltage detection terminal 31 can further be decreased.

In the present embodiment, the surface of the annular member 40 is provided with the plated layer P having a lower modulus of elasticity than the annular member 40, and the annular member 40 contacts the connection terminal 21 and the voltage detection terminal 31 via the plated layer P. Thus, the plated layer P functions as a cushioning layer. For example, the plated layer P is plastically deformed when the connection terminal 21 and the voltage detection terminal 31 are pressed on the plated layer P, and a contact area between the plated layer P and the connection terminal 21 and the voltage detection terminal 31 increases. Accordingly, contact resistance between the plated layer P and the connection terminal 21 and the voltage detection terminal 31 is decreased, and electric resistance of a conduction path electrically connecting the connection terminal 21 and the voltage detection terminal 31 via the plated layer P and the annular member 40 can further be decreased.

Also, in the present embodiment, the tip end 31a of the voltage detection terminal 31 projects further than the tip end 21a of the connection terminal 21 in the direction of the axis A of the annular member 40. Thus, as illustrated in FIGS. 4A and 4B, when the tip end 31a of the voltage detection terminal 31 and the tip end 21a of the connection terminal 21 are to be inserted into the annular member 40, the tip end 31a of the voltage detection terminal 31 can go along the inner circumferential surface of the annular member 40 and can be used as a guide. Accordingly, an operation of inserting the tip end 31a of the voltage detection terminal 31 and the tip end 21a of the connection terminal 21 into the annular member 40 becomes easier, and productivity in a manufacturing process of the secondary battery module 100 can be improved.

Also, in the present embodiment, the voltage detection terminal 31 has flexibility to enable elastic deformation in the direction intersecting with the direction of the axis A of the annular member 40 by abutting on the plated layer P. Thus, when the tip end 31a of the voltage detection terminal 31 goes along the inner circumferential surface of the annular member 40 and is used as a guide, it is possible to prevent the voltage detection terminal 31 from digging into the plated layer P to cause the plated layer P to be damaged. Accordingly, it is possible to effectively prevent an increase in electric resistance of the conduction path electrically connecting the connection terminal 21 and the voltage detection terminal 31 via the plated layer P and the annular member 40.

Also, in the present embodiment, the tip end portion of the connection terminal 21 is provided with the inclined surface 21b facing outside the annular member 40, and the tip end portion 21A is shorter in thickness at a closer position thereof to the tip end 21a. Thus, since the tip end portion 21A of the connection terminal 21 is provided on a side of the inner circumferential surface of the annular member 40 with no sharp edge, the plated layer P on the inner circumferential surface of the annular member 40 is prevented from being damaged when the tip end portion 21A of the connection terminal 21 is inserted into the annular member 40.

Also, in the present embodiment, the annular member 40 includes the pair of elastic deformation portions 41 nipping the connection terminal 21 and the voltage detection terminal 31. Thus, while the force of making the connection terminal 21 and the voltage detection terminal 31 press each other is maintained, the deformation amount or the elastic force of each elastic deformation portion 41 can be reduced further than in a case of providing only one elastic deformation portion 41 on one side. Accordingly, size reduction and weight reduction of the annular member 40 can be achieved.

Also, in the present embodiment, the bus bar 20 is welded on the external terminals 12 and 13 of the rectangular secondary batteries 1, and the voltage detection terminal 31 is soldered to the voltage detection substrate 3 detecting voltage of the rectangular secondary batteries 1. Accordingly, no operation of screwing or the like is required at the time of connecting the connection terminal 21 and the voltage detection terminal 31, and the assembling operation of the secondary battery module 100 is facilitated.

As described above, according to the present embodiment, the secondary battery module 100 having high reliability to deal with an external cause and facilitating an assembling operation can be provided.

Meanwhile, although the case in which the annular member 40 is made of a conductive metal material has been described in the aforementioned embodiment, the annular member 40 does not necessarily have to be conductive and may be made of a non-conductive material such as an alloy, a plastic, a rubber, and a ceramic.

Also, although the case in which both the ends of each of the elastic deformation portions 41 of the annular member 40 in the direction of the axis A are supported by the main body portion 42 has been described in the aforementioned embodiment, the elastic deformation portion 41 may be configured so that one end thereof in the direction of the axis A may be supported by the main body portion 42 while the other end thereof may project inside the main body portion 42. This modification example will be described with reference to FIGS. 8A and 8B.

Figure 8A:
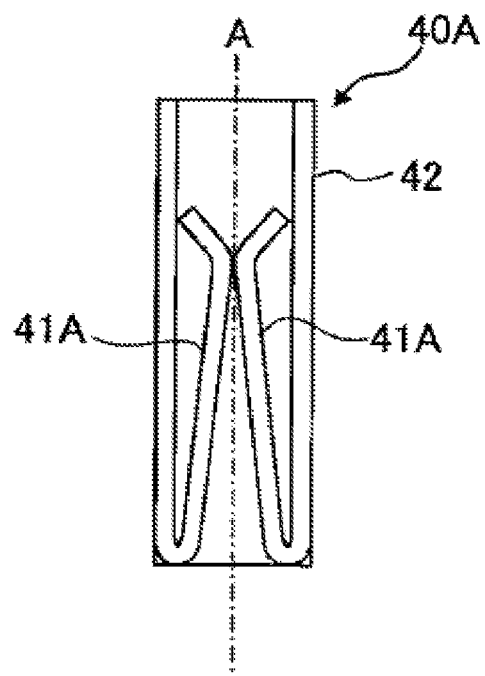
FIG. 8A is a cross-sectional view illustrating a modification example of the annular member illustrated in FIG. 6A.
Figure 8B:
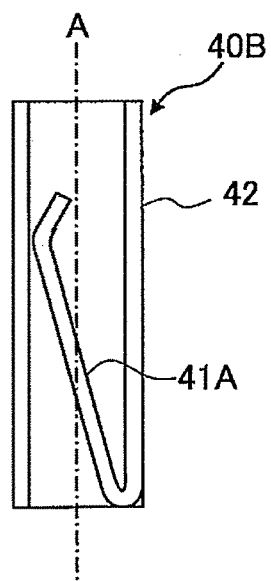
FIG. 8B is a cross-sectional view illustrating a modification example of the annular member illustrated in FIG. 6B.

FIGS. 8A and 8B are cross-sectional views of annular members 40A and 40B including a cantilevered elastic deformation portion 41A. As illustrated in FIGS. 8A and 8B, the elastic deformation portion 41A has one end thereof supported by the main body portion 42 and has the other end thereof project toward the inside of the main body portion 42, and a tip end portion is bent on an opposite side of the projecting direction. As illustrated in FIG. 8A, in a case in which a pair of elastic deformation portions 41 nipping the connection terminal 21 and the voltage detection terminal 31 is provided, the bent tip end portions may abut on the inner circumferential surface of the main body portion 42 to support the tip end portions. Thus, the connection terminal 21 and the voltage detection terminal 31 can be nipped with a stronger force.

Also, the voltage detection substrate 3 may be a flexible printed board. This modification example will be described with reference to FIGS. 9 and 10A to 10C.

Figure 9:
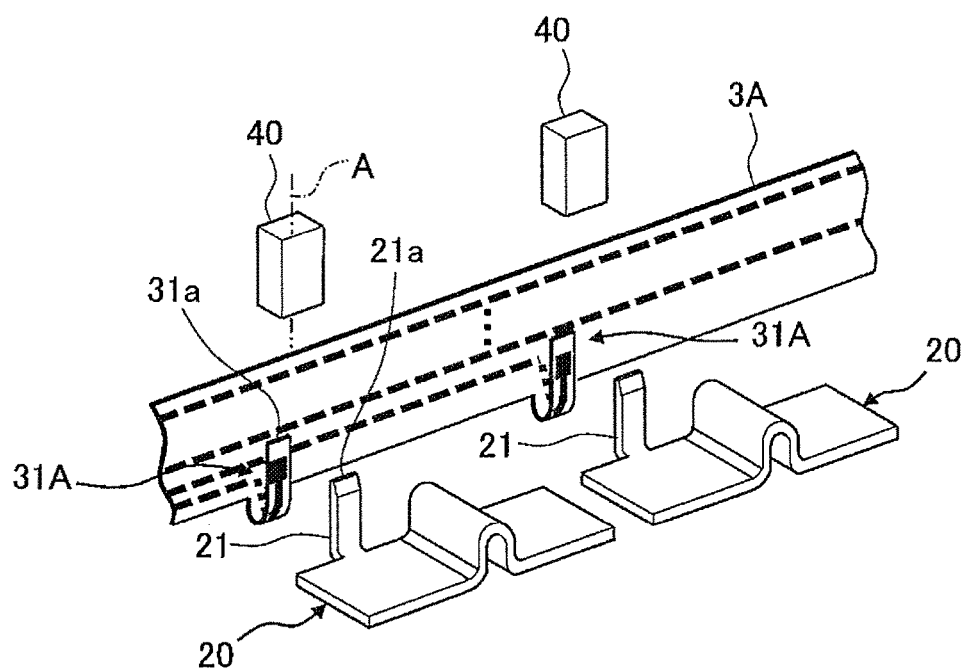
FIG. 9 is an enlarged perspective view illustrating a modification example of the voltage detection substrate illustrated in FIG. 3.
Figure 10A:
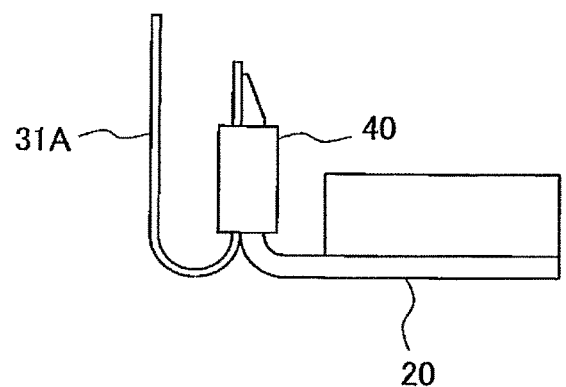
FIG. 10A is an enlarged side view illustrating an example of arrangement of the voltage detection substrate illustrated in FIG. 9.
Figure 10B:
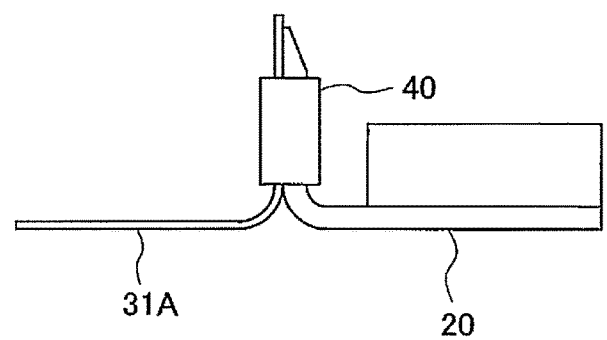
FIG. 10B is an enlarged side view illustrating an example of arrangement of the voltage detection substrate illustrated in FIG. 9.
Figure 10C:
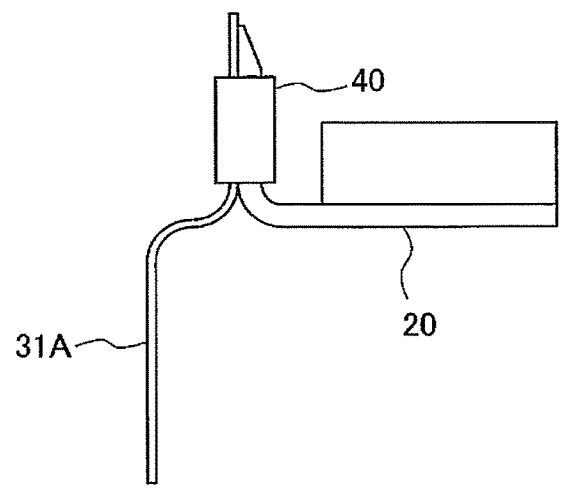
FIG. 10C is an enlarged side view illustrating an example of arrangement of the voltage detection substrate illustrated in FIG. 9.

FIG. 9 is a perspective view of a voltage detection substrate 3A, the bus bars 20, and the annular members 40 corresponding to FIG. 3 in the aforementioned embodiment. FIGS. 10A to 10C illustrate arranging examples of the voltage detection substrate. As illustrated in FIG. 9, in a case in which the voltage detection substrate 3A is a flexible printed board, a part provided with a voltage detection terminal 31A can be curved with use of flexibility of the substrate, and the tip end 31a of the voltage detection terminal 31A and the tip end 21a of the connection terminal 21 of the bus bar 20 can be inserted in the direction of the axis A of the annular member 40 to be aligned with each other in terms of the directions. Thus, as illustrated in FIGS. 10A to 10C, arrangement of the voltage detection substrate 3A can be changed freely.

Also, although the tip end 21a of the connection terminal 21 and the tip end 31a of the voltage detection terminal 31 are aligned with the direction perpendicular to the upper surface 11a of the battery container 11 of the rectangular secondary battery 1 and are inserted in the direction of the axis A of the annular member 40 in the aforementioned embodiment, the direction of the tip end 21a of the connection terminal 21 and the tip end 31a of the voltage detection terminal 31 is not limited to the direction perpendicular to the upper surface 11a of the battery container 11. This modification example will be described with reference to FIG. 11.

Figure 11:
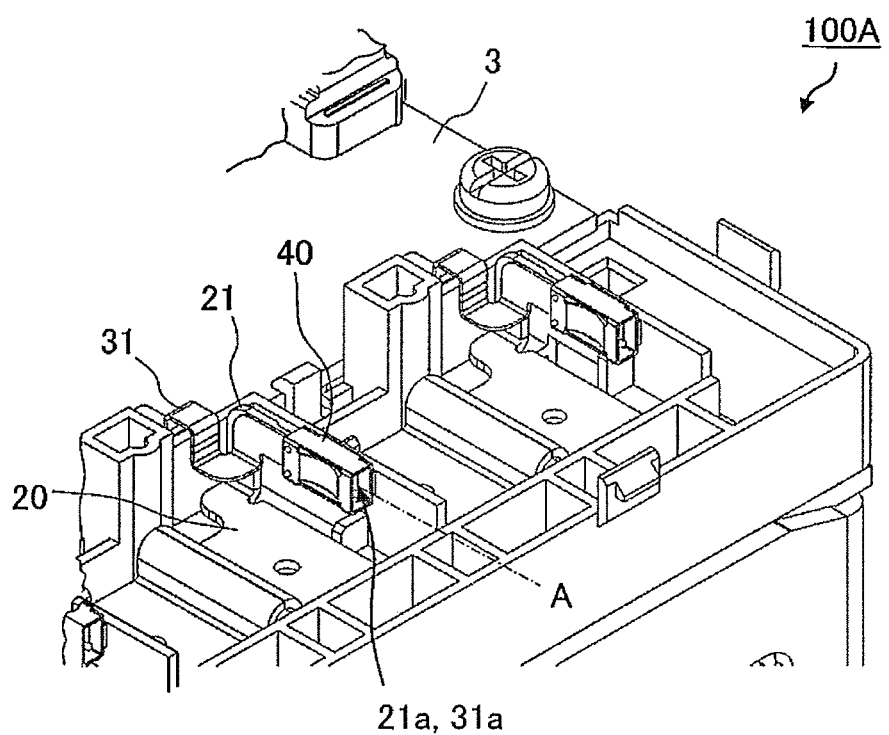
FIG. 11 is an enlarged perspective view of a part around the bus bar according to a modification example of the secondary battery module.

FIG. 11 is an enlarged perspective view of a part around the bus bar 20 of a secondary battery module 100A according to a modification example. As illustrated in FIG. 11, the tip end 21a of the connection terminal 21 and the tip end 31a of the voltage detection terminal 31 are aligned with a direction along the upper surface 11a of the battery container 11 of the rectangular secondary battery 1 and are inserted in the direction of the axis A of the annular member 40. This can not only provide similar effects to those of the secondary battery module 100 described in the aforementioned embodiment but also reduce dimensions of the connection terminal 21, the voltage detection terminal 31, and the annular member 40 in the height direction of the rectangular secondary battery 1, which enables size reduction of the secondary battery module 100A.

The preferred embodiments of the present invention have been described above, and the present invention is not limited to the foregoing embodiments and includes various modification examples. The foregoing embodiments have been described in detail to facilitate understanding of the present invention, and the present invention is not limited to one including all of the components described herein.

REFERENCE SIGNS LIST 1 secondary battery
11 battery container
11a upper surface
12, 13 external terminal
20 bus bar
21 connection terminal
21a tip end
21A tip end portion
21b inclined surface
31 voltage detection terminal
31a tip end
40 annular member
41 elastic deformation portion
42 main body portion
A axis
P plated layer
t1 thickness of voltage detection terminal
t2 thickness of connection terminal

The invention claimed is:

1. A secondary battery module comprising:
an annular member making a tip end of a connection terminal of a bus bar and a tip end of a voltage detection terminal inserted therein in an axial direction to be aligned with each other in terms of directions,
wherein the annular member includes an elastic deformation portion biasing the connection terminal and the voltage detection terminal in directions of making the connection terminal and the voltage detection terminal press each other.

2. The secondary battery module according to claim 1, wherein the annular member includes an annular main body portion, and
wherein the elastic deformation portion has both ends thereof in the axial direction supported by the main body portion and has a center portion thereof in the axial direction curved and projecting inside the main body portion.

3. The secondary battery module according to claim 1, wherein the connection terminal and the voltage detection terminal are formed in flat plate shapes extending in the axial direction, and
wherein a thickness of the voltage detection terminal is less wide than a thickness of the connection terminal.

4. The secondary battery module according to claim 3, wherein a surface of the annular member is provided with a plated layer having a lower modulus of elasticity than the annular member, and the annular member contacts the connection terminal and the voltage detection terminal via the plated layer.

5. The secondary battery module according to claim 4, wherein the tip end of the voltage detection terminal projects further than the tip end of the connection terminal in the axial direction.

6. The secondary battery module according to claim 5, wherein the voltage detection terminal has flexibility to enable elastic deformation in a direction intersecting with the axial direction by abutting on the plated layer.

7. The secondary battery module according to claim 4, wherein a tip end portion of the connection terminal is provided with an inclined surface facing outside the annular member, and the tip end portion is shorter in thickness at a closer position thereof to the tip end.

8. The secondary battery module according to claim 2, wherein the elastic deformation portion is provided to be elastically deformed to cause the connection terminal and the voltage detection terminal to press each other with a force of 3.5 N/mm$^2$ or higher.

9. The secondary battery module according to claim 8, wherein the annular member includes a pair of elastic deformation portions nipping the connection terminal and the voltage detection terminal.

10. The secondary battery module according to claim 1, wherein the bus bar is welded on an external terminal of a secondary battery.

11. The secondary battery module according to claim 1, wherein the voltage detection terminal is soldered to a voltage detection substrate detecting voltage of a secondary battery.

12. The secondary battery module according to claim 1, wherein the annular member is made of a conductive metal material.

13. The secondary battery module according to claim 1, wherein the tip end of the connection terminal and the tip end of the voltage detection terminal are aligned with a direction along an upper surface of a battery container of the secondary battery and are inserted in an axial direction of the annular member.

* * * * *